F. ANSLEY.
FRUIT PICKING DEVICE.
APPLICATION FILED JAN. 16, 1918.

1,334,643.

Patented Mar. 23, 1920.
2 SHEETS—SHEET 1.

INVENTOR.
Frank Ansley
BY L. L. Westfall
ATTORNEY

F. ANSLEY.
FRUIT PICKING DEVICE.
APPLICATION FILED JAN. 16, 1918.

1,334,643.

Patented Mar. 23, 1920.
2 SHEETS—SHEET 2.

INVENTOR
Frank Ansley
BY
ATTORNEY

UNITED STATES PATENT OFFICE.

FRANK ANSLEY, OF SPOKANE, WASHINGTON.

FRUIT-PICKING DEVICE.

1,334,643.   Specification of Letters Patent.   Patented Mar. 23, 1920.

Application filed January 16, 1918. Serial No. 212,046.

*To all whom it may concern:*

Be it known that I, FRANK ANSLEY, a citizen of the United States of America, residing at Spokane, in the county of Spokane and State of Washington, have invented new and useful Improvements in Fruit-Picking Devices, of which the following is a specification.

This invention pertains to apparatus to be used in picking fruits, such as apples, oranges, plums and the like, and has for its object to provide a device of the character described to serve as a catcher for the fruit and a conveyer of the same to a position on the ground or to a position artificially arranged above the ground. A special purpose of the invention is to leave the picker of the fruit free from handicap by providing a receptacle for the fruit, other than in a vessel or bag carried by himself, into which he may rapidly and carelessly throw the fruit as it is picked from the limb with the assurance that the fruit will not be damaged by bruises.

The purpose of the invention is accomplished by the construction illustrated in the accompanying drawings whereby a flexible conveyer is provided at the top with a hopper, baffles being provided in both the hopper and the conveyer and a cushion at the bottom of the conveyer. Means are provided for holding the conveyer and hopper in an inflated and upright position. The drawings also illustrate the idea of resting the conveyer in a box in which it is desired to eventually place the fruit and into which the same may be conveniently emptied from the conveyer. The drawings also illustrate the entire apparatus mounted on a fruit ladder and in such a manner that the same may be swung to different positions for convenience in the picking of the fruit.

Figure 2:
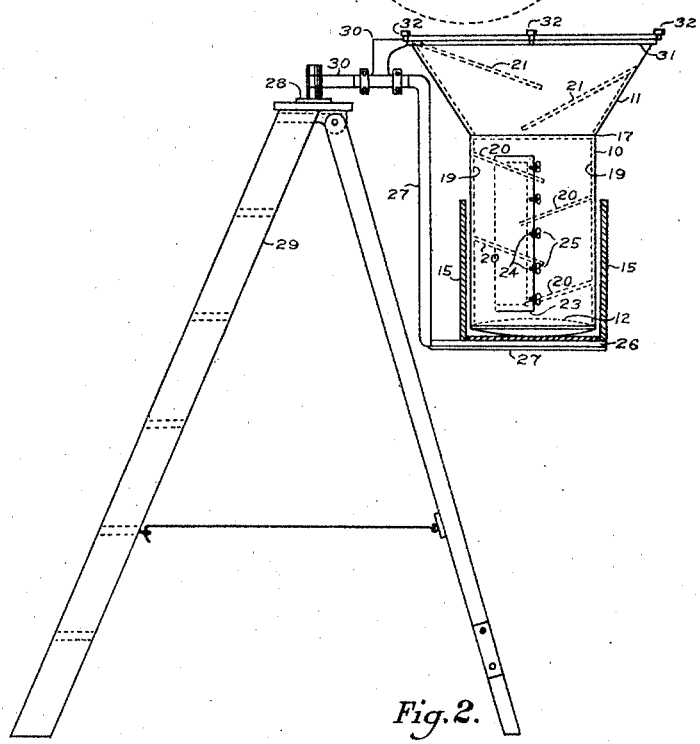
Fig. 2, is a side elevation of the same, together with a sectional view of a box in which the conveyer rests.
Figure 3:
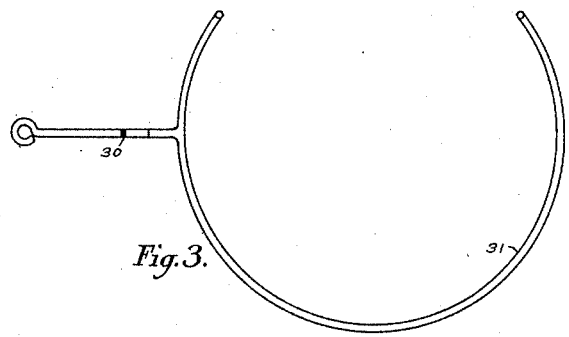
Fig. 3, is a broken-away view of a ring within which the hopper is mounted.
Figure 5:
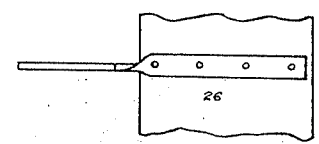
Fig. 5, is a broken-away bottom view of the table upon which the fruit box is rested, shown as riveted to a bracket for its support.
Figure 4:
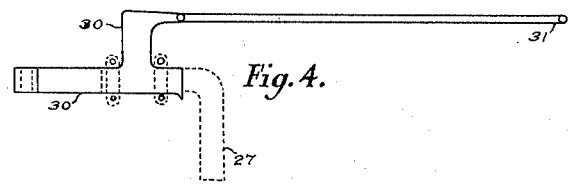
Fig. 4, is a side view of the same shown mounted horizontally in a bracket.
Figure 11:
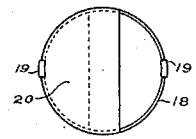
Fig. 11, is a top, plan view of the baffles, the rings to which the same are secured, and of the straps to which the rings are secured.
Figures 8, 10:
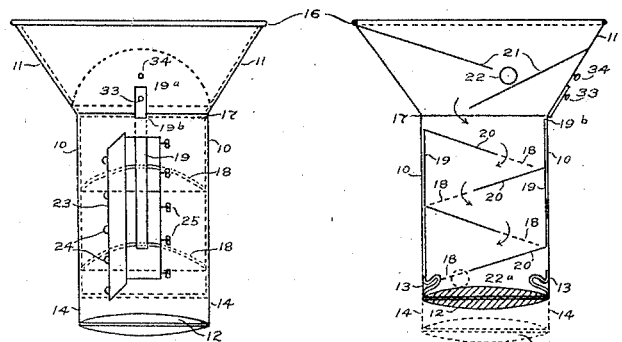
Fig. 8, is a side elevation of the hopper and conveyer, showing a shuttered opening in the side of the conveyer.
Fig. 10, is a sectional view taken on the line 10—10 of Fig. 9.
Figure 12:
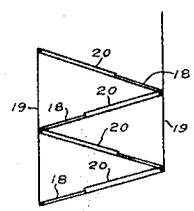
Fig. 12, is a broken-away side elevation of the same.

In a detail description of the apparatus in which like numerals refer to like parts throughout the several views, a flexible conveyer 10 (Fig. 8) is surmounted by a flexible hopper 11, attached thereto. The bottom of the conveyer is open, provided, however, there is a cushion 12, corresponding in size to the opening through conveyer, which is secured to the conveyer adjacent to the bottom thereof, or by straps 13 whereby the cushion 12 may occupy the position shown in Fig. 10 while the fruit is being filled into the conveyer, and changed to the position of the dotted lines 12ª when the conveyer is manually raised, so that the fruit may pass out of the opening 14 into the box or receptacle 15 (Fig. 2). The hopper 11 is held open by an annular ring 16 mounted in the top thereof and the conveyer 10 is held open by an annular ring 17 mounted in the top thereof. Within the conveyer 10, of the size of the opening therethrough, are annular rings 18 (Figs. 11 and 12) attached to straps 19 so as to sit on an angle alternately in opposite directions, and to which are rigidly secured canvas coverings or shelfs 20, covering approximately two-thirds of the opening in the rings 18. A pair of oppositely disposed, overlapping baffles 21 are sewed into the hopper 11 (Fig. 10). Fruit thrown into the hopper 11 (Fig. 10) would find its way by means of gravity at the position indicated by the ball 22, and would follow the course of the arrow to the position indicated by the dotted lines 22ª, resting on the cushion 12. It is understood that the conveyer 10 may be of great length or of any desired length, and as a matter of convenience I have provided a hinged shutter 23 (Fig. 8) opening into the conveyer 10 near the bottom thereof which would be the portion thereof where the fruit would accumulate. This shutter has means for securing it in a closed position comprising buttons 24 and clasps 25.

Figure 1:
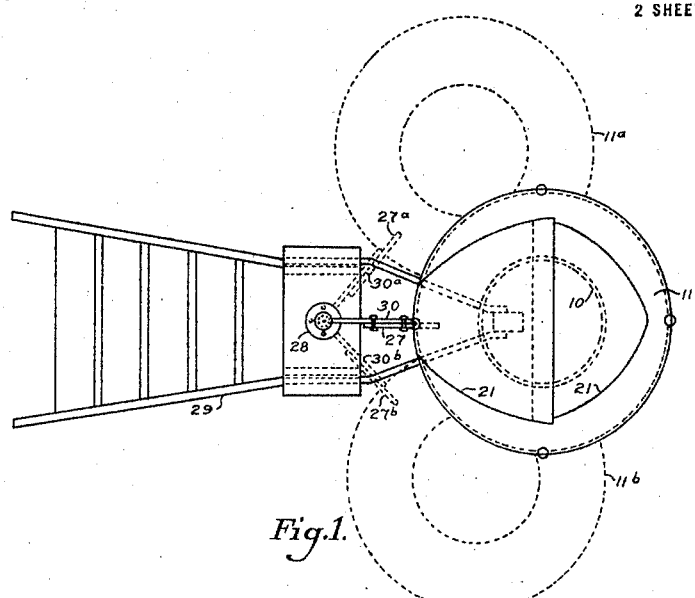
Figure 1, is a top, plan view of the apparatus as secured to a fruit ladder, showing in dotted lines different positions of the same and to which it may be swung.
Figure 7:
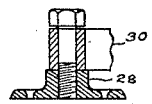
Fig. 7, is a sectional view of a bearing secured to the top of the ladder and in which a supporting bracket is secured, the same showing a broken-away view of the bracket and the manner in which the same is secured in the bearing.
Figure 9:
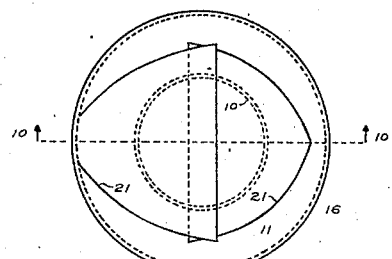
Fig. 9, is a top plan view of the hopper and conveyer.
Figure 6:
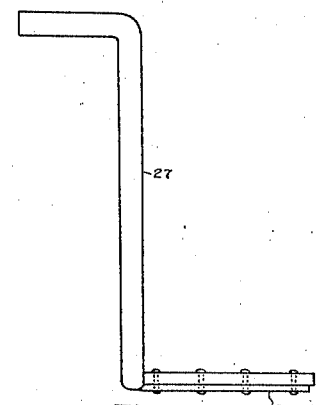
Fig. 6, is a side view of the bracket and table.

As a convenient means of illustrating the practical use of the device I have shown the same with a short conveyer 10 (Fig. 2) resting in a box 15 on a table 26 supported by a bracket 27, rotatably mounted in a bearing 28 secured to the top of a fruit ladder 29. An extension 30 from the bracket 27 supports an annular ring 31 within which the hopper 11 is secured, the ring 16 of the hopper 11 and the ring 31 being held together by means of clamps 32. A stud threaded into the bearing 28 (Fig. 7) and extending upwardly through the bracket 27 serves to provide means for a rotary motion for the bracket 27 whereby the device may be turned from one position to another as indicated by the dotted lines 11$^a$ and 11$^b$ (Fig. 1).

The angle of the baffles may be altered by the adjustment of the straps 19 (Fig. 8) as by having an extension 19$^a$ to the strap extend through the flexible wall of the conveyer 10 as at 19$^b$ and having an opening 33 therethrough and buttons 34 sewed to the outer wall of the hopper 11.

What is claimed is,

A fruit picking device, comprising a flexible conveyer, a hopper thereto, baffles mounted in the conveyer, the same being attached to annular rings within the conveyer of the approximate diameter of the diameter of the conveyer, and made adjustable by means of straps connecting said annular rings, the upper ends of the straps being brought to the surface of the conveyer through openings in the conveyer wall, and means for adjustably anchoring said strap ends outside of said conveyer wall.

In testimony whereof I affix my signature in presence of two witnesses.

FRANK ANSLEY.

Witnesses:
L. L. WESTFALL,
J. S. MCANDREW.